United States Patent [19]
Nassiri

[11] Patent Number: 4,592,570
[45] Date of Patent: Jun. 3, 1986

[54] ULTRA LIGHT WHEELCHAIR

[75] Inventor: Joe-Massoud Nassiri, Thousand Oaks, Calif.

[73] Assignee: Everest & Jennings, Camarillo, Calif.

[21] Appl. No.: 545,882

[22] Filed: Oct. 27, 1983

[51] Int. Cl.[4] .......................... B62M 1/14; A61G 5/02
[52] U.S. Cl. .............................. 280/650; 280/242 WC; 280/289 WC; 297/DIG. 4; 297/379
[58] Field of Search ............... 280/647, 650, 242 WC, 280/289 WC, 657, 661, 281 LP; 297/DIG. 4, 345, 346, 311, 328, 355, 379, 51; 180/907; 248/394, 188.2, 345.1; 16/38, 39, 31 A; 293/125; 296/20; 403/DIG. 4; 301/5.7

[56] References Cited

U.S. PATENT DOCUMENTS

| | | | |
|---|---|---|---|
| 1,620,657 | 3/1927 | Herold | 16/39 |
| 1,851,843 | 3/1932 | Inman | 403/DIG. 4 |
| 2,022,348 | 11/1935 | Hoerle | 301/5.7 |
| 3,243,194 | 3/1966 | Trusock | 280/43.12 |
| 3,882,949 | 5/1975 | Anderson | 280/650 X |
| 4,082,348 | 4/1978 | Haury | 297/DIG. 4 |
| 4,169,626 | 10/1979 | Hollar, Jr. | 297/379 |
| 4,360,213 | 11/1982 | Rudwick | 297/DIG. 4 |
| 4,371,183 | 2/1983 | Dion | 297/DIG. 4 |
| 4,380,343 | 4/1983 | Lovell et al. | 297/DIG. 4 |
| 4,392,690 | 7/1983 | Anderson | 280/647 X |
| 4,428,594 | 1/1984 | Minnebraker | 297/DIG. 4 |
| 4,477,098 | 10/1984 | Minnebraker | 297/DIG. 4 |
| 4,500,102 | 2/1985 | Haury et al. | 280/242 C |

FOREIGN PATENT DOCUMENTS

| | | | |
|---|---|---|---|
| 883578 | 7/1943 | France | 280/280 |
| 451392 | 8/1936 | United Kingdom | 293/125 |

*Primary Examiner*—John J. Love
*Assistant Examiner*—Mark Dukes
*Attorney, Agent, or Firm*—Pastoriza, Kelly & Lowry

[57] ABSTRACT

The ultra light chair is designed for greater stability, higher performance, higher efficiency and overall better appearance than conventional chairs. A seat frame is provided separate from the main frame with seat mountings permitting longitudinal, tilt and height adjustments of the seat on the main frame. Unique wheel mountings permit simple manual removal and attachment of the wheels to the main frame, using only one hand. The same wheel mountings permit adjustment of the camber angle of each wheel relative to a vertical plane so that propelling and maneuvering of the wheelchair can be made easier than in the absence of any camber. The seat back for the chair is designed to fold down over the seat frame so that this feature in combination with easy removal of the wheels provides for compact storage during travel.

22 Claims, 23 Drawing Figures

ULTRA LIGHT WHEELCHAIR

FIELD OF THE INVENTION

This invention relates generally to wheelchairs and more particularly to an ultra light high performance wheelchair which can be used in everyday activities as well as sports activities.

BACKGROUND OF THE INVENTION

Presently available wheelchairs are all characterized in that the seat frame is normally part of the main frame of the chair that supports the wheels. As a consequence, severe limitations are placed on any type of adjustments of the chair for optimum comfort of a patient. For example, if the center of gravity of the chair with a patient seated therein is to be shifted, it is necessary in some manner to change the horizontal distance between the seat and the rear wheels. Since the seat is normally a part of the frame, this adjustment is presently being made by actually shifting the rear wheels on the main frame of the wheelchair. For example, by shifting the rear wheels to a position closer to the seat, the center of gravity is effectively positioned closer to the main wheels.

Further adjustments of the seat such as tilt can only be effected with present day chairs by again changing the main wheels. For example, the level of the main wheels can be shifted by shifting the axle position on the main frame, while maintaining the caster wheels at their pre-existing positions.

In wheelchairs it is a desirable feature to be able to adjust the camber of the main wheels; that is, the angle that the plane of these wheels makes with the vertical. Such camber adjustment at the present time is made by washers. This adjustment requires taking the wheels apart and inserting washers to provide for the desired camber. The adjustment is time consuming and the final positions can only be done in steps rather than providing for a smooth camber adjustment to a desired angle.

There is a real need at the present time for a vastly improved ultra light high performance wheelchair wherein numerous adjustments of the seat relative to the frame can be effected without having to change the position of the main wheels on the frame. Further, there is a need for enabling a simple camber adjustment of the wheels to be realized so that such adjustment can be effected without having to disassemble the wheelchair and wherein adjustment in integral steps is avoided.

BRIEF DESCRIPTION OF THE PRESENT INVENTION

With all of the foregoing considerations in mind, the present invention contemplates the provision of a vastly improved construction for a wheelchair providing for a lighter chair capable of higher performance and higher efficiency and which exhibits a substantially improved overall appearance. This chair is constructed for everyday use as well as sport.

In its broadest aspect, the chair includes a main frame. Left and right main wheels are provided on this main frame. Rather than having any seat frame constituting a part of the main frame, there is provided a separate seat frame. The invention is completed by the provision of attachment means for attaching the separate seat frame to the main frame in a desired position.

The foregoing construction enables the seat to be adjusted with respect to its longitudinal position, tilt and height relative to the main frame. There is no necessity for moving the wheels relative to the main frame. In fact, the basic concept of a seat frame wholly separate from the main frame and only attached thereto by adjustable attaching means has never before been known to the best of applicant's knowledge.

BRIEF DESCRIPTION OF THE DRAWINGS

A better understanding of this invention as well as many further features and advantages will be had by now referring to a preferred embodiment as illustrated in the accompanying drawings in which.

DETAILED DESCRIPTION OF THE PREFERRED EMBODIMENT

Figure 1:
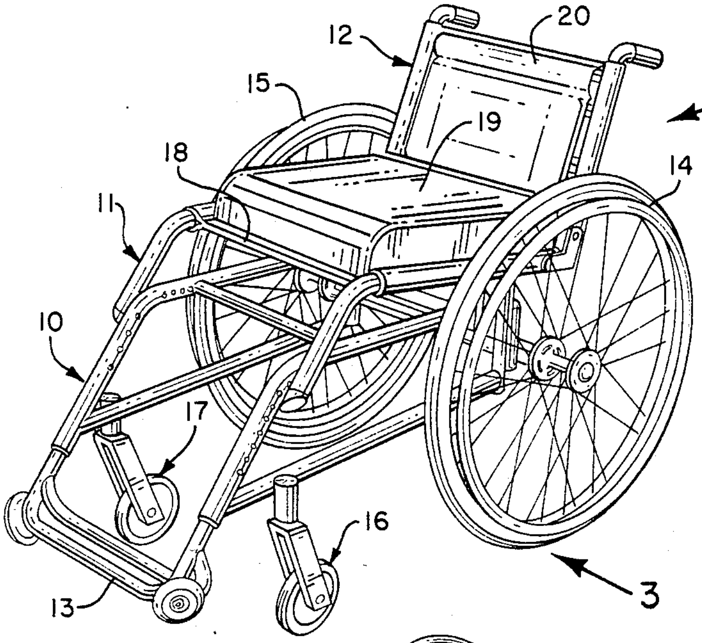
FIG. 1 is a ¾ front perspective view of the ultra light wheelchair of this invention.

Referring first to FIG. 1, the ultra light wheelchair includes a basic main frame designated generally by the numeral 10 upon which is mounted a seat frame designated generally by the numeral 11. A back frame 12 is articulated to the seat frame 11 as will be described subsequently and a U shaped foot rest tube 13 extends from the forward portion of the main frame 10. Left and right main wheels 14 and 15 are detachably secured to the rear portion of the main frame 10 as will also be described subsequently. Caster wheel means in the form of left and right caster wheels 16 and 17 are mounted on the lower forward portion of the main frame 10.

The chair of FIG. 1 is completed by the provision of seat upholstery 18 wrapped on the seat frame 11, a seat pillow 19, if desired, and seat back upholstery 20 wrapped on the back frame 12.

Figure 2:
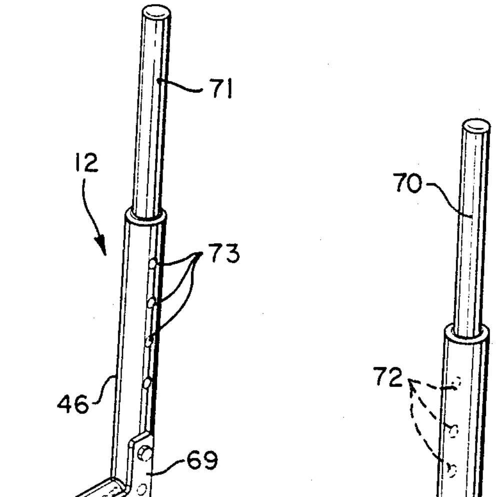
FIG. 2 is an enlarged exploded view of frame portions of the chair shown in FIG. 1 without upholstery covering useful in explaining the overall construction of the chair.
Figure 2:
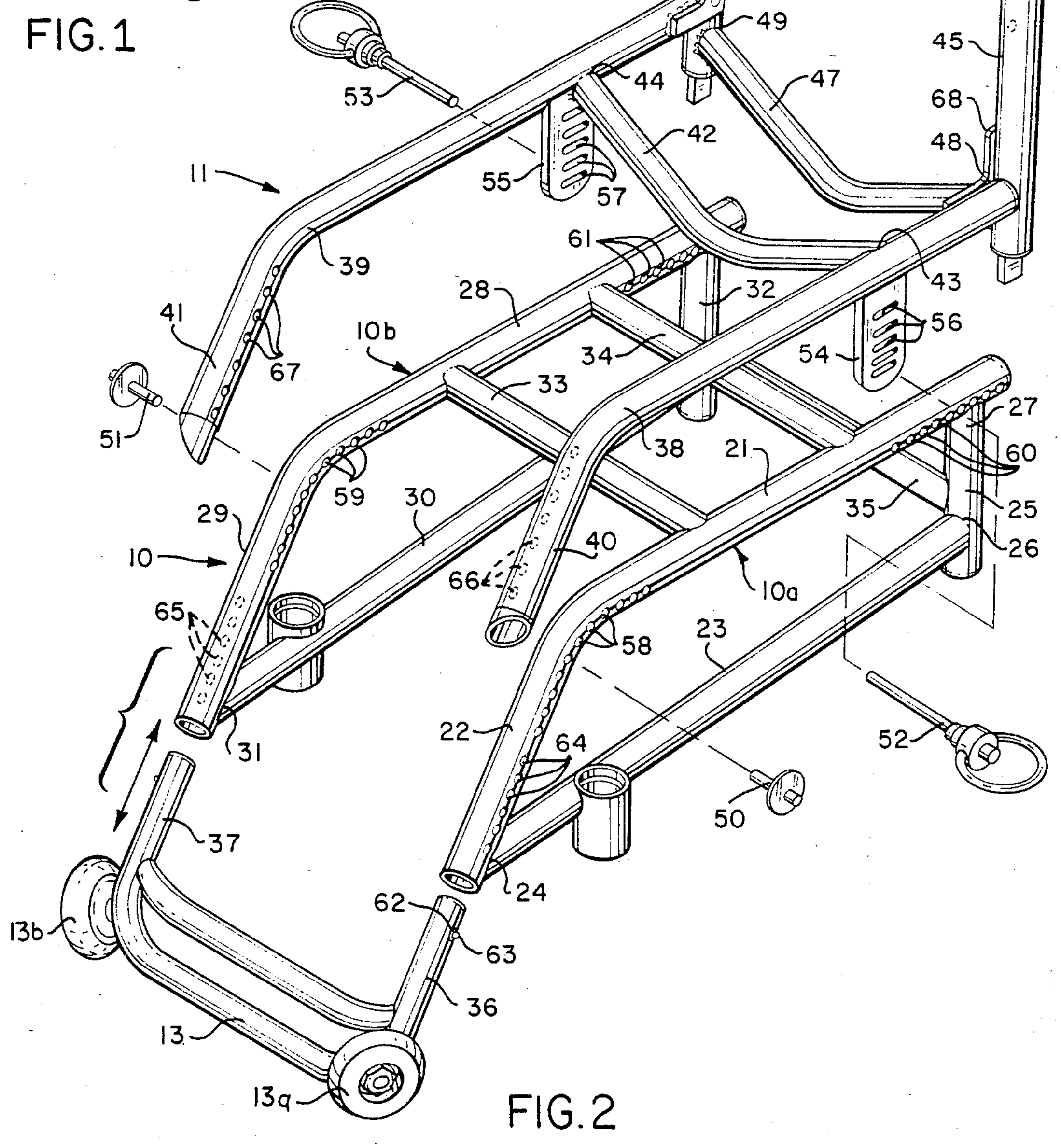

Referring now to FIG. 2, further details of the main frame and seat frame will become evident. As shown, the seat frame 10 includes left and right frame sides 10*a* and 10*b*. Each of these frame sides includes an horizontal longitudinally extending upper tube or rail such as indicated at 21 for the left frame side 10*a* terminating at its front end in a forward and downwardly sloping section 22. A horizontal longitudinally extending lower tube 23, in turn, runs generally parallel to and beneath the upper tube 21, the front end of the lower tube being secured to the end portion of the downwardly sloping section 22 as at 24. The left frame side is completed by the provision of a vertical tube 25 connected to the rear end of the lower tube 23 as at 26 and to the underside of the rear end portion of the upper tube 21 as at 27.

The right frame side 10*b* similarly includes a horizontally extending upper tube or rail 28 terminating in a front sloping section 29, a lower horizontal tube 30 connected to the forward end of the upper tube 28 as at 31 and a vertical tube 32 connecting between the rear ends of the lower and upper tubes 30 and 28. The left and right frame sides considered together thus include two upper tubes, two lower tubes and two vertical tubes.

The main frame is completed by the provision of first and second longitudinally spaced transverse tubes 33 and 34 connected between the upper tubes of the left and right frame sides and a third transverse tube 35 connected between the lower ends of the vertical tubes 25 and 32 respectively of the left and right frame sides for holding the left and right frame sides in spaced parallel relationship.

Referring now to the lower forward portion of FIG. 2, it will be noted that the foot rest 13 of general U-shape has left and right rearwardly and upwardly extending legs 36 and 37 arranged to be telescopically received within the downwardly sloping sections 22 and 29 respectively of the main frame. The arrangement is such that the distance of the foot rest 13 from the seat frame 11 described in FIG. 1 can be adjusted all as will be described subsequently. The foot rest 13 also serves to rotatably mount bumper rollers 13*a* and 13*b*. These rollers will engage the floor and walls before the main frame and prevent marking thereof when the chair is used in sports. Also, the rollers by rolling on engaged wall areas will prevent sudden stops of the chair.

Still referring to FIG. 2, the seat frame 11 is shown disposed above the main frame 10 and includes left and right longitudinally extending seat frame rails 38 and 39 spaced further apart than the left and right frame sides 10*a* and 10*b*. These frame rails have forward and downwardly sloping front ends 40 and 41 arranged to straddle the front ends of the upper tubes 21 and 28 of the left and right frame sides. The seat frame 11 also includes a downwardly bowed seat frame tube 42 extending transversely between the rails 38 and 39 to connect thereto at points 43 and 44 closer to the rear ends of the rails than the front ends. This bowed seat frame tube will hold the rails in spaced relationship at the points 43 and 44.

The back frame 12 includes upwardly extending left and right seat back posts 45 and 46 and a downwardly bowed back frame tube 47 extending transversely between the posts and connected to the posts at points 48 and 49 adjacent to the lower ends of the posts.

An attaching and adjustment means for attaching the seat frame to the main frame and also enabling adjustment of the seat frame relative to the main frame with respect to its longitudinal position, tilt and height will now be described with respect to FIG. 2. This attaching and adjustment means includes front seat pins shown exploded away from the left and right frame sides 10*a* and 10*b* as at 50 and 51 and rear seat pins similarly shown exploded away from the sides of the seat frame 11 as at 52 and 53. Also illustrated are rear adjusting plates shown at 54 and 55 secured to the underside of the seat rails 38 and 39 to extend downwardly as shown. These plates each have a series of horizontal slots in vertical alignment such as indicated at 56 and 57 respectively.

Cooperating with the foregoing components are the upper tubes 21 and 28 of the main frame which are provided with a front series of longitudinally spaced diametric holes 58 and 59 and a rear series of longitudinally spaced diametric holes 60 and 61, respectively. As will become clearer as the description proceeds, the pins 50 and 51 are initially positioned in any selected ones of the diametric holes 58 and 59 respectively while selected diametric holes 60 and 61 can be made to register with selected ones of the slots in the rear plates 54 and 55, the pins 52 and 53 then securing the same together.

Before considering further the various seat adjustments realizable by the foregoing described parts, reference is had to further details relating to the adjustment of the foot rest 13 relative to the main frame 10. Referring to the lower portion of FIG. 2, it will be noted that the forwardly and rearwardly extending leg 36 include a side opening 62 through which extends a spring biased lock button 63. The other upwardly and rearwardly extending leg 37 similarly includes such an opening and spring biased button, but the same is not visible in the view of FIG. 2.

The sloping sections 22 and 29 each includes a series of longitudinally spaced holes on their outer walls indicated at 64 for the section 22 and in phantom lines at 65 for the section 29. Selected ones of these holes will receive the lock button, such as the button 62 when a desired telescoped position of the legs 36 and 37 in the sloping sections 22 and 29 is effected.

Referring once again to the seat frame 11 as shown in FIG. 2, it will be noted that the downwardly front sloping portions 40 and 41 of the rails 38 and 39 are provided on their inside wall surfaces with a series of longitudinally spaced holes 66 and 67. These holes cooperate with the diametric front holes 58 and 59 in the upper tubes 21 and 28 of the main frame in attaching the seat frame to the main frame, all as will become clearer as the description proceeds.

The back frame 12 as illustrated in FIG. 2 is coupled to the rear of the rails 38 and 39 of the seat frame as by left and right L-shaped plates 68 and 69. The posts 45 and 46 in turn include extension tubes 70 and 71 telescopically received therein and adjustable to a desired height by means of indexing holes 72 and 73 in the main posts 45 and 46. These adjustments will also become clearer as the description proceeds.

Figure 3:
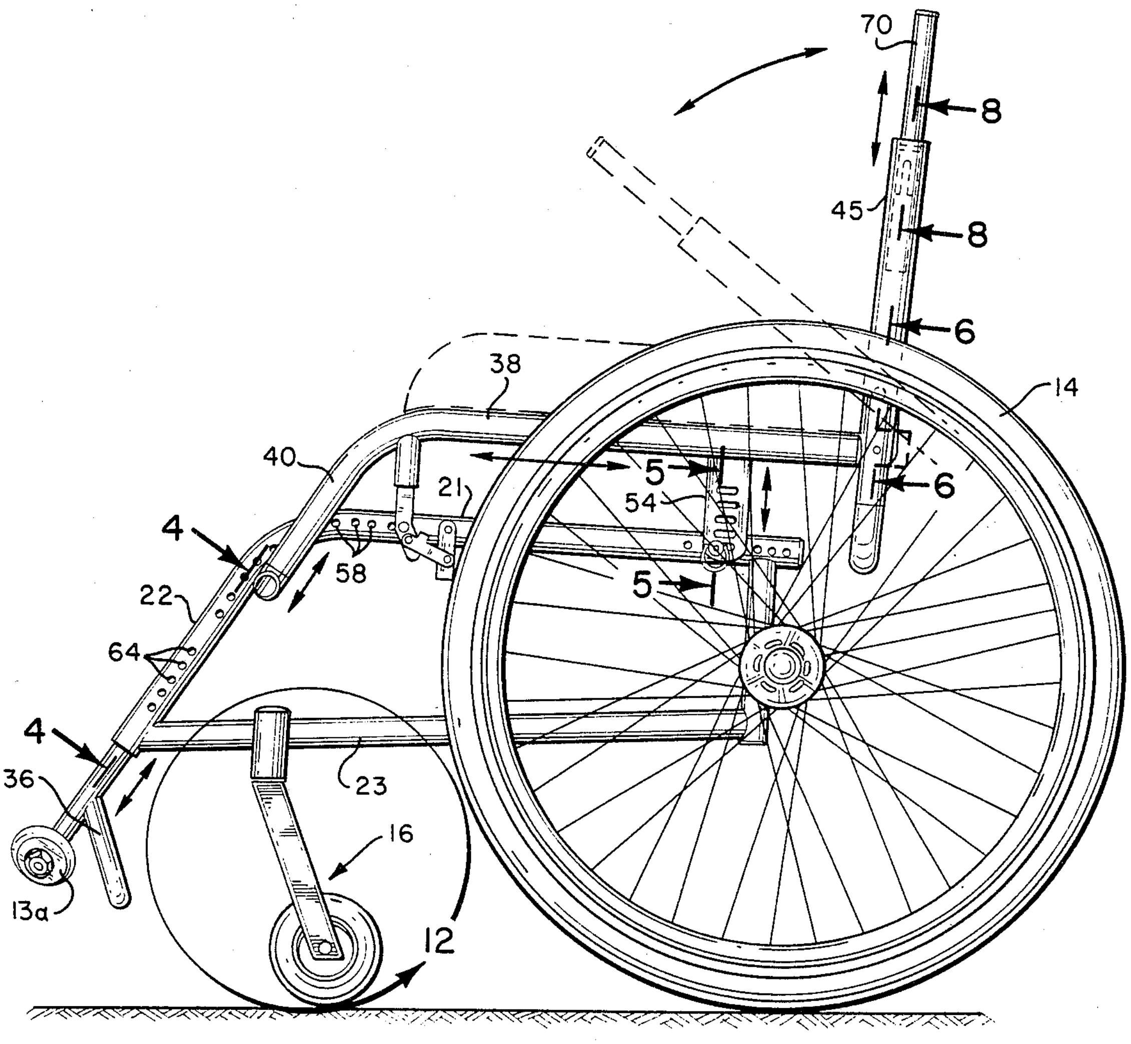
FIG. 3 is a side elevational view of the wheelchair looking in the direction of the arrow 3 of FIG. 1.

Referring now to the side elevational view of FIG. 3, the seat frame is shown attached to the main frame and the foot rest is shown secured within the forward sloping sections of the main frame. With respect to this latter construction, reference is had to the detailed showing of FIG. 4 which illustrates clearly the U leg 36 of the foot rest 13 telescopically received within the sloping section 22 of the left frame side of the main frame. It will be noted that there is provided a U-shaped spring 74 biasing the lock button 63 through the opening 62. The arrangement is such that the lock button 63 can be manually urged inwardly to be flush with the exit end of the opening 62 so that the leg 36 can be telescopically moved within the sloping section 22, the button 63 automatically snapping out into a selected one of the various holes 64.

The various diametric holes 58 in the same sloping section 22 of the main frame cooperate with the front seat pin 50 as described in conjunction with FIG. 2 to attach the seat frame to the main frame. In this respect, it will be noted that after the pin 50 has been received within a selected one of the openings 58 in the sloping section 22, a collar 75 on the pin 50 seats against the outside periphery of the selected opening and serves as a bearing collar against which an inside portion of the forward sloping part of the seat rail indicated at 40 can rest. A selected one of the inwardly facing holes 66 described in FIG. 2 for this part of the seat rail will receive an extending pin portion 76 from pin 50. In this respect, the forwardly sloping portion 40 which straddles the forward sloping sections of the main frame is urged outwardly to the phantom line position as illustrated at 40' in order that a desired selected hole 66 can receive the extending pin portion 76.

With reference once again to FIG. 2, in attaching the seat frame to the main frame, a first adjustment that might be made would be to select a desired seat level and longitudinal position for the seat frame. If it is desired to have the longitudinal position of the frame forward, then one of the more forward openings 58 in the upper tube 21 of the main frame would be selected. If the seat is to be positioned more rearwardly, then one of the more rearward holes 58 on the upper tube 21 of the main frame is selected.

It will be understood that the other forward sloping portion 41 of the seat frame rail shown in FIG. 2 is similarly secured to the outer extending pin portion for the front seat pin 51 after the same has been received in one of the diametric holes 59.

Figure 4:
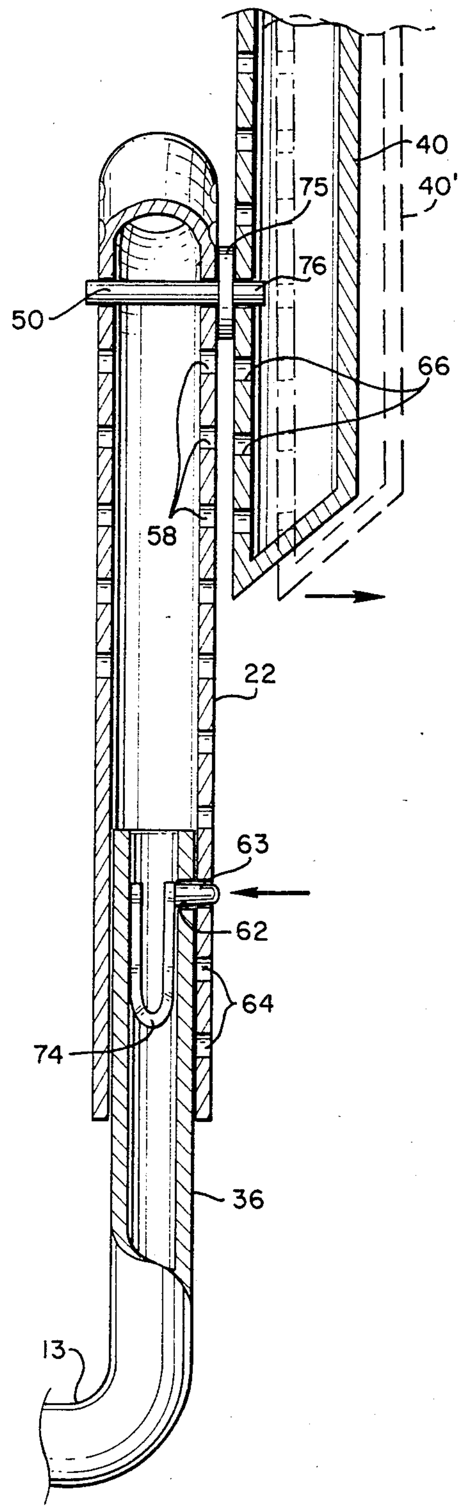
FIG. 4 is an enlarged fragmentary cross section of foot rest and forward seat portions of the frame illustrating various adjustment means looking in the direction of the arrows 4—4 of FIG. 3.

After the front portion of the seat frame rails have been attached by means of the pin 50 as described in the upper portion of FIG. 4, the rear portions of the seat frame rails are attached by way of the adjusting plates 54 and 55 described in FIG. 2 to the rear portion of the main frame. In this respect, reference is once again had to the side elevational view of FIG. 3 wherein there is shown the adjusting plate 54 having one of its slots in registration with one of the rear diametric openings in the upper tube 21 of the main frame. It will be appreciated from the view in FIG. 3 that the tilt of the seat frame rails relative to the main frame can now be adjusted depending upon the particular slot in the adjusting plate 54 selected. If it is desired to have the seat tilt backwardly, then one of the higher slots in the adjusting plate 54 is placed into registration with the particular diametric hole on the rear part of the upper tube 21 of the main frame. Similarly, the seat can be tilted forwardly by selecting a lower one of the slots, or alternatively selecting a higher one of the openings 66 in the tube portion 22 for cooperation with the pin 50 all as described in FIG. 2.

Figure 5:
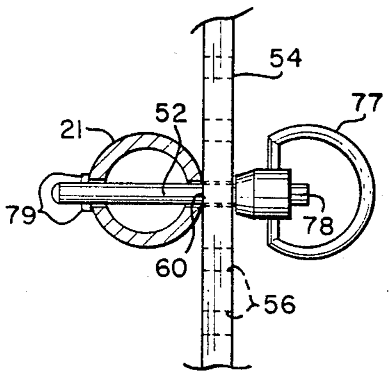
FIG. 5 is a fragmentary cross section of the seat frame height adjusting means looking in the direction of the arrows 5—5 of FIG. 3.

FIG. 5 illustrates clearly the manner in which the adjusting plate 54 can have one of its slots 56 in registration with a selected one of the openings 60 of the upper tube 21 of the main frame. For convenience in inserting and removing this rear seat pin 52, the same may be provided with a ring 77 for easy grasping and pulling of the pin 52 away from the slot and registered opening or similarly inserting the pin. In this respect, there may be provided a simple internal push rod 78 coaxial with the pin 52 for releasing laterally extending projections 79 which serve to lock the pin in place so long as no pressure is applied to the push rod 78. When the push rod 78 is urged inwardly, it will permit the projection 79 to contract within the periphery of the outer pin portion 52 so that the pin can be withdrawn. Any similar type locking device for holding the pin in position may be provided.

Referring back to FIG. 2, the adjusting plate 55 is similarly secured by the rear seat pin 53 in the manner as described for the pin 52 and adjusting plate 54. The horizontal extent of the slots 56 and 57 in the adjusting plates 54 and 55 as shown in FIG. 2 assure that a selected slot will register with one of the openings when adjusting the seat tilt angle. As stated heretofore, within certain limits, the longitudinal adjustment of the seat relative to the main frame is independent of the height or tilt adjustments which are controlled by the particular slot in the vertical array in each plate that is selected for attachment to the main frame upper tube 21 and the particular holes in the forwardly sloping portion of the rails of the seat frame and the forward portions of the upper tubes of the main frame.

The particular order in which the seat attachments are made to the main frame is not critical. Actually, the seat in its separated condition from the main frame can be first manually held over the main frame in any number of positions; that is, it can be moved back and forth, tilted and raised and lowered while observing its relationship to the main frame. Once a desired positioning or orientation is decided upon, then there can be found, within acceptable limits, appropriate holes and slots in registration for connection by the pins.

Thus, the chair seat can be customized for optimum comfort, fit and performance for a patient. Also, the distance of the foot rest 13 from the seat once the seat has been adjusted can be carefully adjusted by the the telescoping extent of the legs within the forward sections, all as described heretofore.

Figure 6:
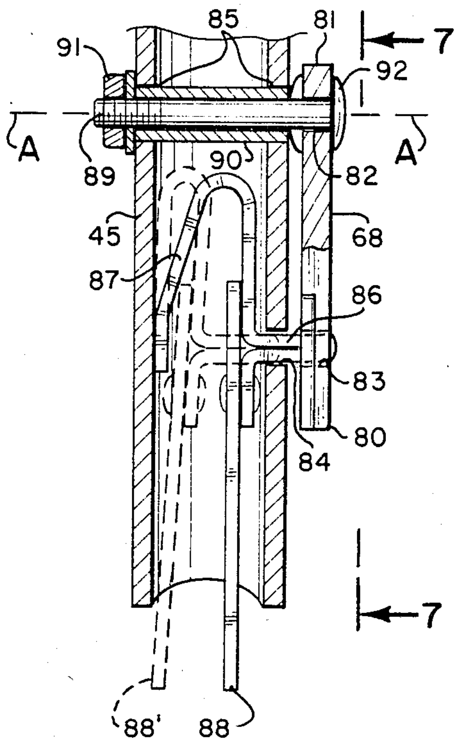
FIG. 6 is a fragmentary cross section of the seat back frame tilt adjusting and latching means looking in the direction of the arrows 6—6 of FIG. 3.
Figure 7:
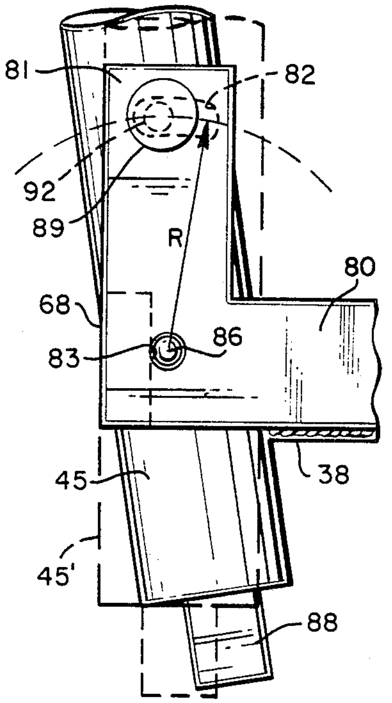
FIG. 7 is a fragmentary side elevational view of the seat back tilt adjusting and latching means looking in the direction of the arrows 7—7 of FIG. 6.
Figure 8:
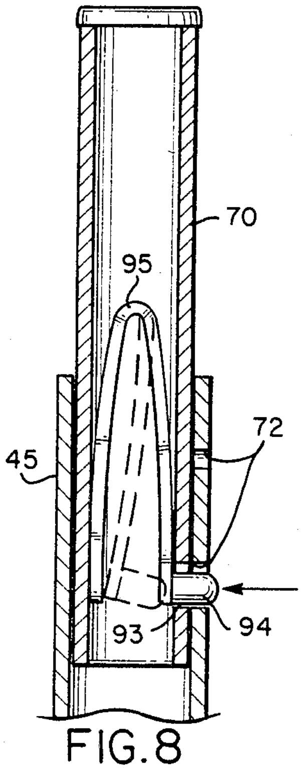
FIG. 8 is a fragmentary cross section illustrating the seat back frame extension adjustment taken in the direction of the arrows 8—8 of FIG. 3.

Referring now to FIGS. 6, 7 and 8, details of the coupling of the back frame 12 to the rear of the seat frame rails will be described.

As will be recalled from FIG. 2, the coupling means comprise left and right L-shaped brackets 68 and 69. The horizontal legs of these brackets are rigidly secured to the inside end portions of the left and right rails 38 and 39 of the seat frame 11. The vertical legs of these brackets lie along the inner facing walls of the left and right posts 45 and 46.

Since each bracket constitutes a mirror image of the other and functions to couple the corresponding post to the adjacent rear portion of the seat frame rail, a detailed description of one will suffice for both.

With respect to the foregoing, the L-shaped bracket 68 will be described in detail with respect to FIGS. 6 and 7 wherein the horizontal leg is indicated at 80 and the vertical leg at 81. Still considering FIGS. 6 and 7 together, it will be noted that the upper end 81 of the bracket has an arcuate slot 82, and the vertex of the bracket has a hole 83 corresponding to the center of curvature of the arcuate slot 82. The radius of curvature is indicated at R in FIG. 7. In actual practice the slot 82 would be straight since it is easier to machine a straight slot rather than an arcuate slot. However, the slot 82 would have sufficient width to accommodate an arcuate path of radius R. For convenience of identification, the slot will be referred to as arcuate.

With specific reference to FIG. 6, the lower end of the seat back post 45 has an opening 84 passing through the inside wall in registration with the hole 83 in the associated bracket 68 and a diametric opening 85 at a higher level in registration with the arcuate slot 82. A lock button 86 biased by a spring 87 in the lower end of the post 45 extends through the openings 84 in the inside wall of the post into the hole 83 of the bracket. Button 86 can be removed from the one hole by means of a downwardly extending lever 88 attached to the button 86 as shown. The lower end of the lever 88 extends from the lower end of the post so that it can be manually moved to the phantom line position 88' thereby removing the button 86 from the outer opening to unlatch the post.

Referring to the upper portion of FIG. 6, there is provided bolt means including a bolt 89 passing through the arcuate slot 82 of the L-shaped bracket and through the diametric hole 85 in the post to define means for pivoting the lower portion of the back frame post to the rear end portion of the corresponding seat frame rail. It will be appreciated that when the lock button 86 is retracted from the one opening 84, then the post 45 can pivot about the bolt 89 and sleeve 90 so that the back frame of the seat can be folded forwardly and downwardly over the seat as indicated by the phantom line position of the back frame in FIG. 3.

The bolt means including the bolt 89 serves a further function in addition to operating as a pivot in folding down the back seat frame. This further function constitutes an adjustment of the tilt angle of the back frame relative to the seat frame. In this respect, the bolt means including the bolt 89 further includes a journalling sleeve 90 and a nut 91. The journalling sleeve passes through the diametric opening 85 in the post to journal the described pivoting movement of the post. One end of this sleeve engages the upper and lower edges of the slot 82 in the associated L-shaped bracket 68 as shown in FIG. 6, the bolt 89 passing within the sleeve with its head 92 engaging the opposite upper and lower edges of the slot 82 as most clearly shown in FIG. 7. The nut 91 is threadedly received on the extending opposite end of the bolt to overlie the other end of the journalling sleeve 90 so that tightening of the nut locks a selected arcuate position of the bolt in the slot whereby the tilt angle of the seat back frame relative to the seat frame can be adjusted within the confines of the slot 82 for optimum comfort to a patient seated in the wheelchair. This tilting is indicated by the phantom lines for the post 45 indicated at 45' in FIG. 7. Once the tilt is set, it will remain the same when the seat back is latched in its up position from a folded position.

Referring now to FIG. 8 taken in the direction of the arrows 8—8 of FIG. 3, the manner in which the extension post 70 can be adjusted with respect to the back seat frame post 45 will be described. Since the other extension post 71 illustrated in FIG. 2 operates in the same manner, a detailed description of one will suffice for both.

Thus, with specific reference to FIG. 8, the back post extension tube 70 is shown telescopically received in the upper end of the seat back post 45. The extension tube 70 has a side opening 93 in its lower wall and a spring biased lock button 94 extending from the inside of the extension tube through the side opening 93. A U-shaped spring 95 biases the button 94 in an outward direction but this button can be manually retracted as indicated by the arrow so that it will be flush with the extension tube 70. With this arrangement, a selected one of the series of vertically spaced holes 72 in the post as described in FIG. 2 can be placed in registration with the side opening 93 in the extension tube so that the button 94 will automatically snap into the registering hole to lock the extension tube in its adjusted telescoped position. The height of the back frame can thus be adjusted for optimum comfort of a patient seated in the wheelchair and leaning against the back frame.

From the detailed description of the invention thus far, it will be appreciated that the adjustable features permit customizing the chair for optimum use by the particular purchaser. Longitudinal positioning of the seat will shift the horizontal distance of the center of gravity relative to the main wheels. If high maneuverability of the wheelchair is desired, as is the case when it will be used in sports, it might be desirable to have the seat frame adjusted longitudinally rearwardly so that the horizontal distance of the center of gravity of a person seated in the chair will be closer to the center of the main wheels, making it very simple to lean back in the chair or manipulate the chair using merely the two main wheels. On the other hand, where the chair is to be used for everyday operations, it will be somewhat more stable if the seat frame is adjusted to a more forward position, that is, closer to the caster wheels. The tilt and height of the seat frame would be adjusted depending upon the desires of the user and overall height of the user. Similarly, the distance of the foot rest from the front of the seat frame can be adjusted and the tilt and height of the back frame can be adjusted depending upon the physical characteristics of the user.

Figure 9:
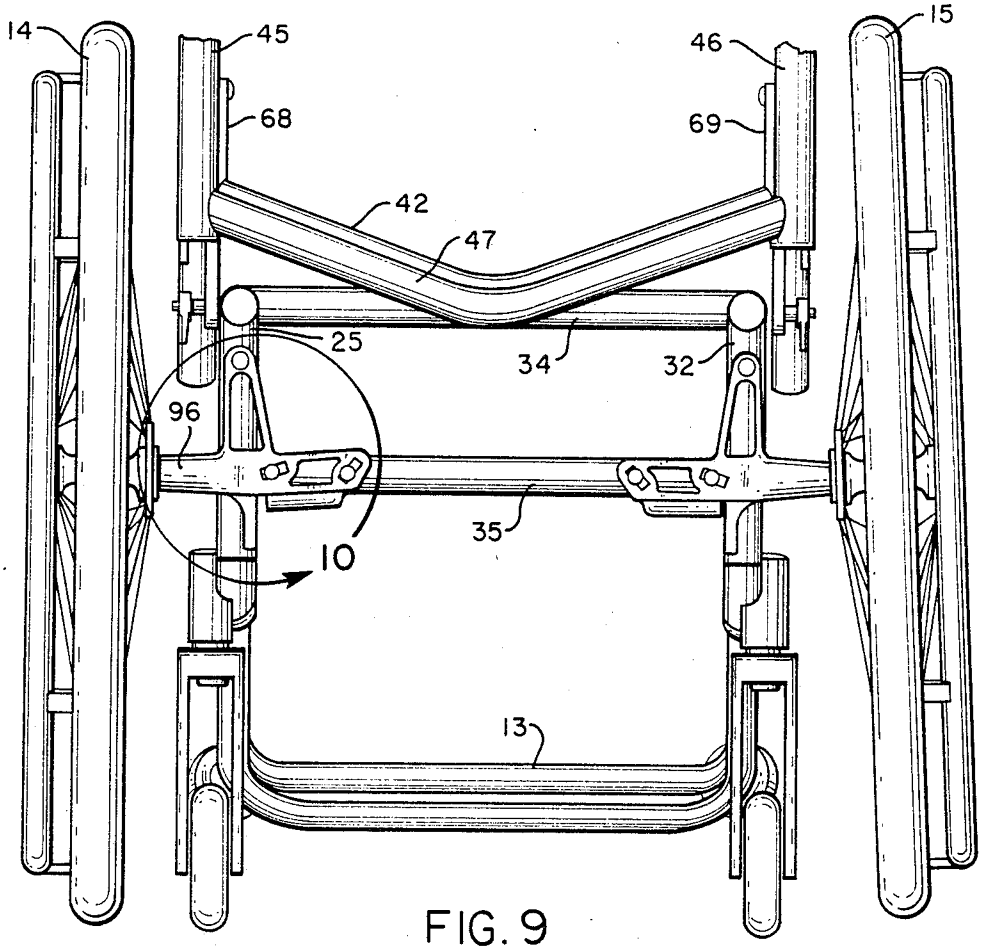
FIG. 9 is a rear end elevational view of the lower portion of the wheelchair looking in the direction of the arrow 9 of FIG. 1.
Figure 10:
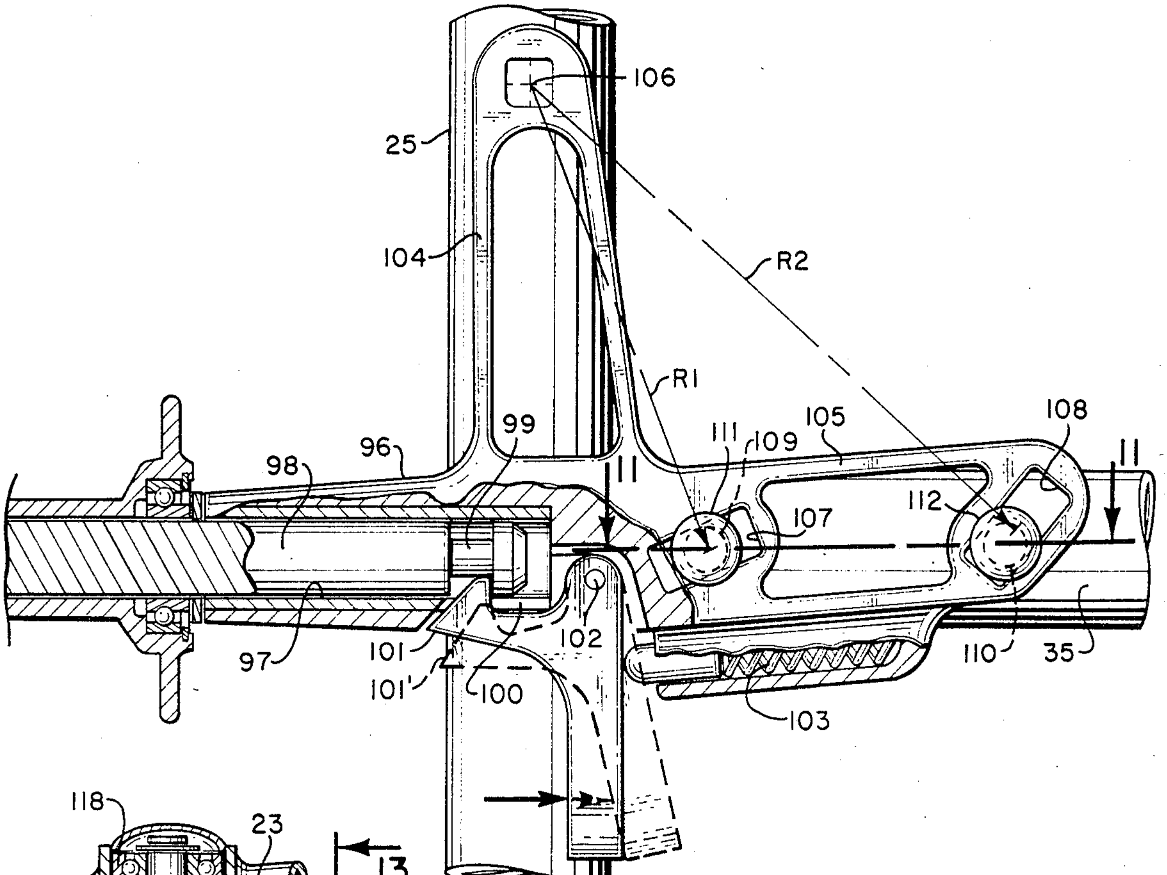
FIG. 10 is a greatly enlarged fragmentary view partly in cross section of one of the wheel mountings enclosed within the circular arrow 10 of FIG. 9.
Figure 11:
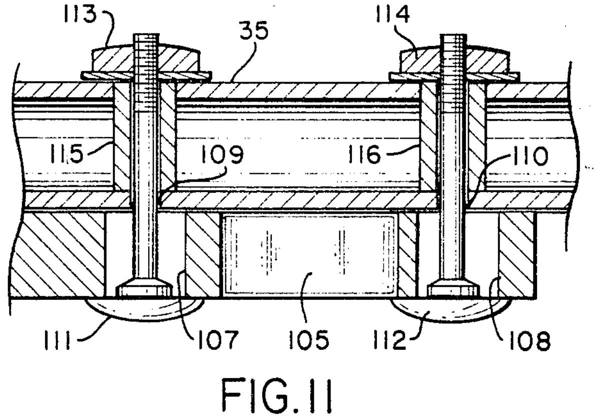
FIG. 11 is a fragmentary cross section of a portion of the wheel mounting taken in the direction of the arrows 11—11 of FIG. 10.
Figure 13:
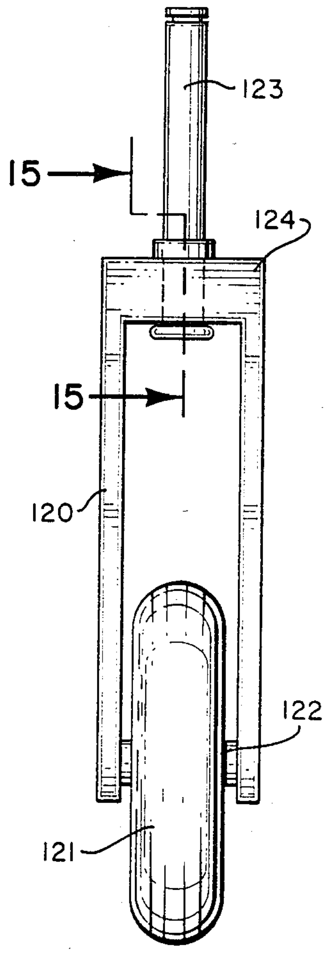
FIG. 13 is an elevational view of the caster wheels separated from the wheelchair looking in the direction of the arrows 13—13 of FIG. 12.

Referring now to FIGS. 9, 10, and 11, details of the manually operable means for attaching and detaching the main wheels as well as for adjusting the camber of the wheels will be described.

Considering first FIG. 9 showing a rear view of the chair, identical numerals designate the same components visible in FIG. 9 as described in FIG. 2. It will be noted that the manual operable means for attaching and detaching the main wheels include, for each wheel, a journalling plate such as indicated at 96 for the left main wheel 14. A similar journalling plate constituting essentially a mirror image of the plate 96 is provided for the right main wheel 15. These journalling plates are respectively secured to the rear vertical tubes 25 and 32 of the main frame as described in FIG. 2.

Since the journalling plates function in essentially the same manner, a detailed description of one will suffice for both. Thus, referring in detail to the journalling plate 96 as illustrated in FIG. 10, the same includes an axle receiving bore 97 for receiving the axle 98 of the left wheel. The outer end portion of axle 98 has a reduced diameter section 99 to define an annular channel. A portion of the wall of the bore 97 juxtaposed to the channel 99 when the axle is fully inserted in the bore defines an opening 100.

A manually operable pawl 101 is pivoted to the journalling plate 96 as at 102 and further spring biased as by a spring 103 to a position in which the pawl is received through the opening 100 into the annular channel 99 to thereby lock the axle against withdrawal from the bore. This position of the pawl is illustrated in solid lines in FIG. 10.

By now manually pivoting the pawl in a counterclockwise direction about the pivot point 102 as viewed in FIG. 10; that is, in a direction opposite to the biased direction by the spring 103, the pawl is removed from the channel as indicated by the phantom line position of the pawl at 101'. In this position the axle 98 of the wheel can easily be withdrawn from the bore to remove the entire wheel.

With respect to the foregoing, the design of the pawl and journalling plate constitute an important feature of the present invention. This design is such that the main wheel can be removed with only one hand. For example, the hub can be grasped with one hand and a finger or thumb of this same hand used to push inwardly the lower end of the pawl 101 as indicated by the heavy arrow in FIG. 10 to unlatch the axle 98. The wheel while still held by the same hand is then simply pulled away from the plate as described.

To insert the wheel, again only one hand is necessary, the wheel axle 98 simply being urged into the receiving bore 97 of the journalling plate 96. The end of the axle will then bias the pawl 101 towards its dotted line position until the pawl itself snaps over into the channel 99 to lock the axle 98 within the bore. The wheel can then only be removed by manually rotating the pawl about the pivot point 102 as described in FIG. 10.

The journalling plate 96 is also designed to enable adjustment of the camber of the wheel supported thereby; that is, the angle of the plane of the wheel to a vertical plane. Referring back to FIG. 9, it will be noted, for example, that the left wheel 14 has a zero camber; that is, its plane corresponds to a vertical plane. The right hand main wheel 15, on the other hand, is mounted at a camber angle; that is, the plane of the wheel is at an angle to a vertical plane. This camber angle is possible by means of the journalling plate supporting the wheel as will now be described referring back again to FIG. 10.

As shown, the journalling plate 96 includes a first arm 104 extending generally vertically along the rear side of the vertical tube 25 constituting part of the main frame, and a second arm 105 extending generally horizontally in a direction opposite to the direction of the axle receiving bore 97 so as to lie along the rear side of the third transverse tube 35 constituting part of the main frame.

The upper end of the first arm 104 is pivoted to the vertical tube 25 at a given point 106.

The inner end of the second arm 105 has a first remote slot 107 with its center of curvature at the pivot point 106 the radius of curvature being indicated at R1. The outer end of this same second arm 105 has a second arcuate slot 108 also having its center of curvature at the pivot point 106, the radius of curvature for the slot 108 being indicated at R2.

As in the case of the slot 82 described in FIG. 7, the slots 107 and 108 are, in practice, straight slots but formed with sufficient widths to accommodate an arcuate path of radius of curvature equal to R1 and R2 respectively. Again, for convenience, these slots will be referred to as arcuate since they encompass an arcuate path.

Referring now to both FIGS. 10 and 11, the third transverse tube 35 is provided with diametric holes 109 and 110 positioned to register with the slots 107 and 108. As best illustrated in FIG. 11, first and second bolt members 111 and 112 pass through the first and second arcuate slots in registering holes respectively. As shown, the bolts have enlarged heads for engaging the periphery of their associated slots together with first and second nuts 113 and 114. These nuts overlie the periphery of the exit end of the associated diametric hole and appropriate compression sleeves 115 and 116 surround each bolt between its nut and the inside periphery of the entrance end of its associated diametric hole. As a consequence, the second arm 105 of the journalling plate can be tightly clamped to the third transverse tube 35 after adjusting the angle of the axis of the axle receiving bore with respect to the horizontal within the limits of the arcuate slots 107 and 108 thereby enabling the camber angle of each main wheel relative to a vertical plane to be individually adjusted.

Referring once again to FIG. 9, in will be noted that when a fairly large camber angle is provided as for the right main wheel 15, it is easier for a user of the chair to grasp the wheel ring and to propel and maneuver the wheelchair. On the other hand, some users may prefer not to have any camber for either wheel such as indicated for the left main wheel 14.

It will be appreciated from the foregoing description that a single journalling plate for each wheel has been so designed as to permit very simple manual removal and attaching of the wheel and also permit adjustment of the camber angle of the wheel through an infinite number of positions as opposed to integral steps.

FIGS. 12 through 15 illustrate the preferred caster wheels employed with the wheelchair of this invention. Since each caster wheel is the same, a detailed description of one will suffice for both.

Figure 12:
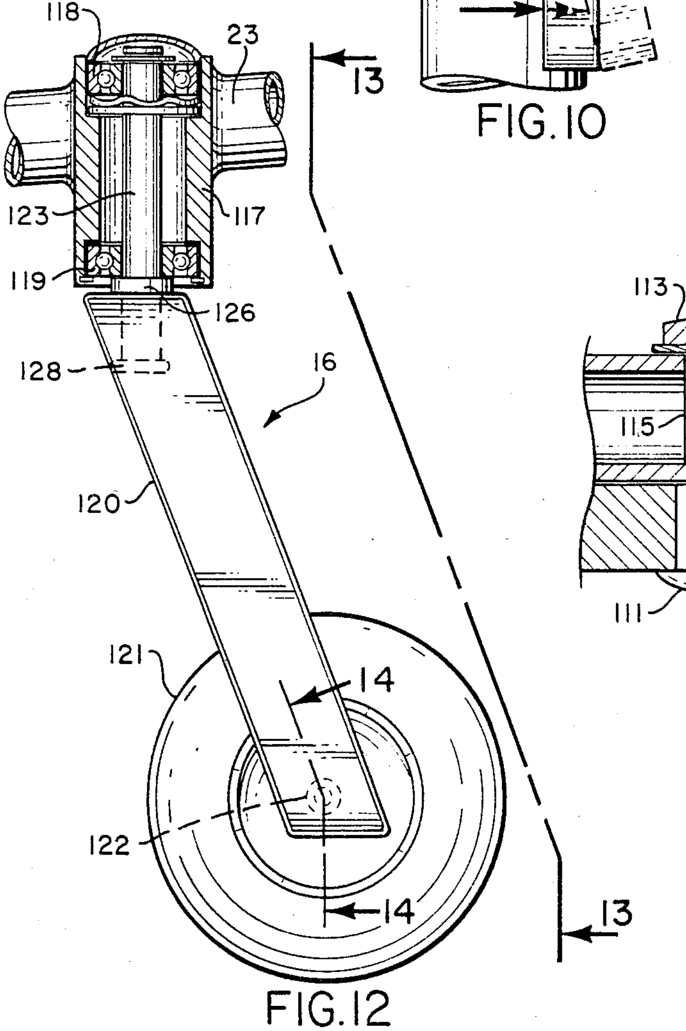
FIG. 12 is an enlarged view partly in cross section of one of the caster wheels enclosed within the circular arrow 12 of FIG. 3.

Thus, referring first to FIG. 12, there is shown the caster wheel 16 secured to the lower tube of the left frame side of the main frame as illustrated in FIG. 1. This lower tube 23 as shown partially in FIG. 12 has secured to it a caster stem socket 117 incorporating appropriate bearings 118 and 119 at its upper and lower ends. The caster wheel itself as shown in both FIGS. 12 and 13 includes a sloping fork member 120 rotatably mounting a wheel 121 between its lower ends as by bearings 122. A caster stem 123 extends generally vertically upwardly from the top portion of the fork member 120 receivable in the caster stem socket 117 as best shown in FIG. 12. A fixed washer and wavy washer assembly may be provided between the underside of the upper bearing 118 and the reduced diameter central portion of the caster socket 117 to hold the stem 123 against longitudinal movement; that is, to inhibit vibrations and effect a firm holding of the stem within the socket.

Figure 14:
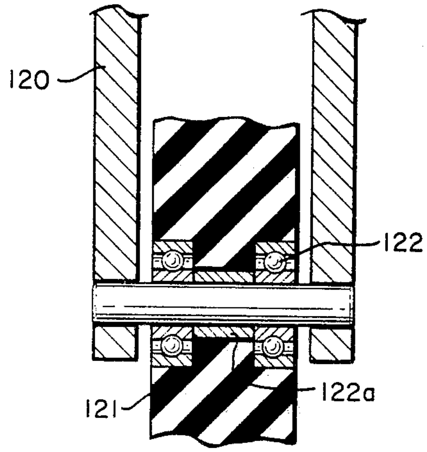
FIG. 14 is a fragmentary cross section of the caster wheel bearing taken in the direction of the arrows 14—14 of FIG. 12.

FIG. 14 shows details of the bearing 122 for the caster wheel 121 within the lower portion of the fork 120. As shown, a split sleeve **122*a*** is provided about the axle for the bearing and is of spring material to grip the axle. This spring will thus hold the axle centered in the bearing and prevent it from moving longitudinally.

Figure 15:
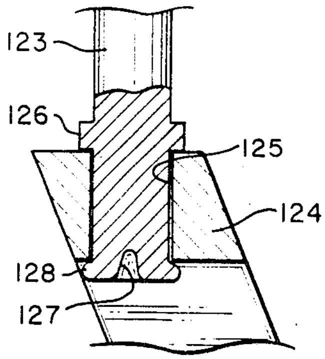
FIG. 15 is a fragmentary cross section of the lower stem portion of the caster wheel taken in the direction of the arrows 15—15 of FIG. 13.

FIG. 15 shows one way for securing the upper portion of the fork 120 to the stem 123. This means includes a solid block 124 which constitutes in the preferred embodiment an integral part of the remaining fork 120. A vertical bore 125 is formed in this block. The lower portion of the caster stem 123 has an enlarged diameter portion 126 for seating on top of the block 124 when the remaining lower portion is received in the bore 125. The lower end of the stem is provided with a cavity 127 permitting a flaring out of the stem end as at 128 to engage the periphery of the lower end opening of the bore 125 in the block. The caster stem is thus thoroughly secured between the the enlarged diameter portion 126 and the exit lower end of the bore 125.

FIGS. 16 through 20 illustrate examples of the upholstery wrapping 18 for the seat and 20 for the back frame briefly described in FIG. 1.

Figure 16:
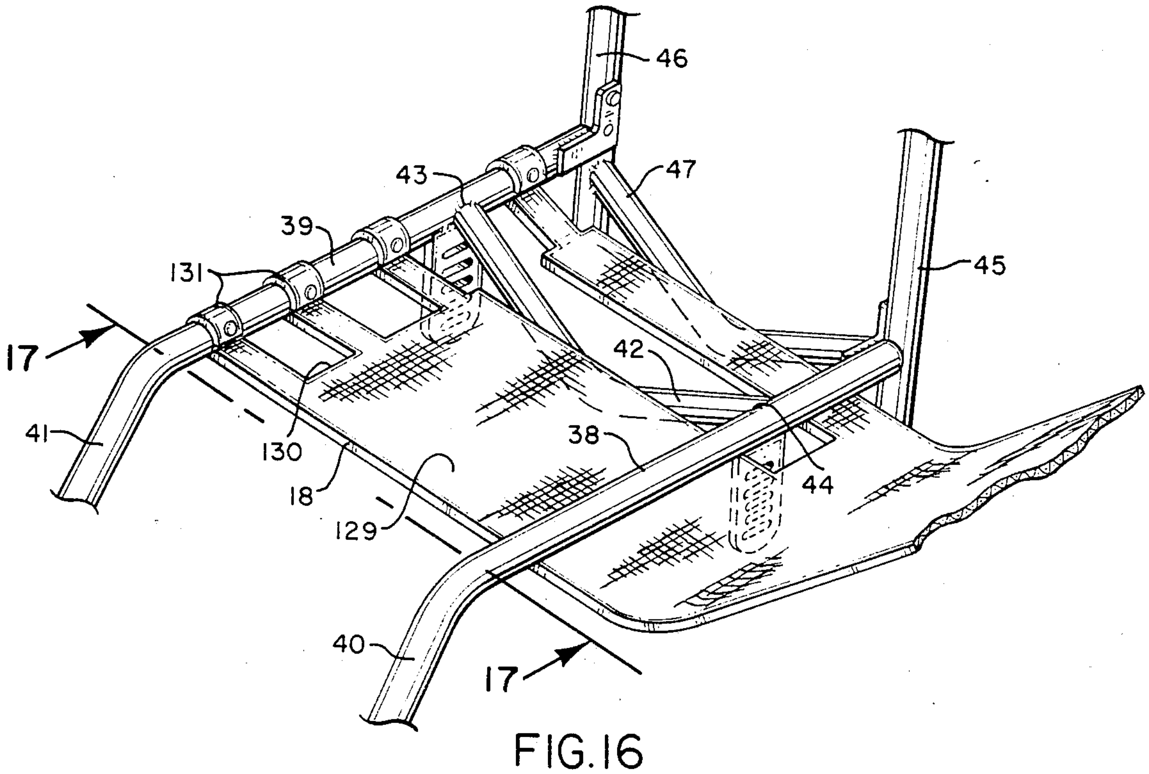
FIG. 16 is a fragmentary perspective view of a portion of the seat frame of the wheelchair illustrating the manner in which upholstery wrapping is attached.

Referring first to FIG. 16, the upholstery material 18 includes a fabric seat panel 129 of elongated rectangular shape, having one transverse end 130 terminating in extending hook means 131 for attaching this one end to the seat frame rail 39.

Figure 17:
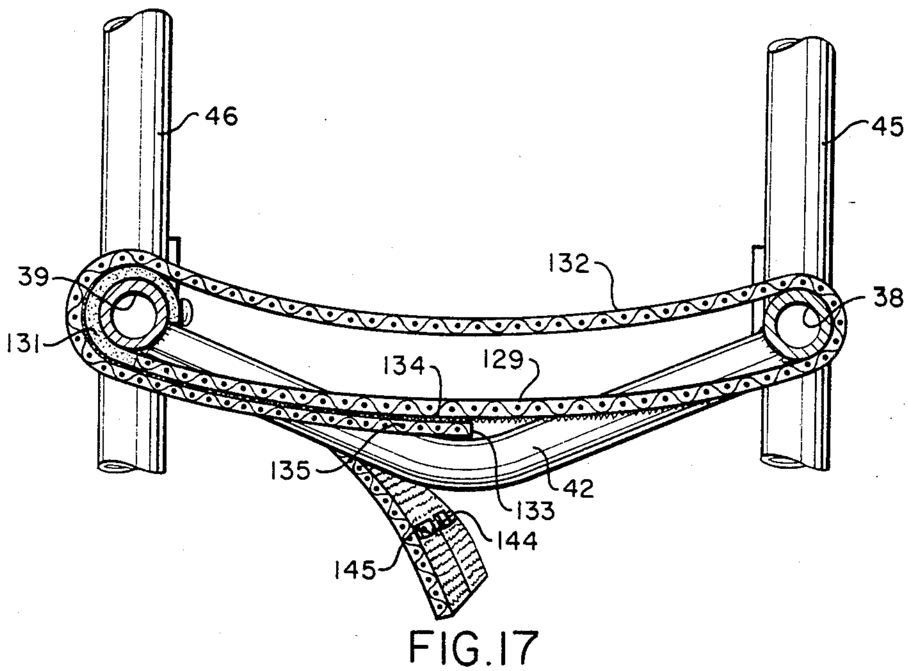
FIG. 17 is a front elevational view of the seat frame and upholstery wrapping after the same has been completed looking generally in the direction of the arrows 17—17 of FIG. 16.

Referring to the front view of FIG. 17, the initial portion 129 of the panel passes under and around over the top of the other seat frame rail 38 as indicated at 132. The panel continues over to the initial seat rail 39 to pass over the hook means 131 to terminate at its other transverse end 133 beneath the initial portion of the panel 129. The underside of the initial portion of the panel and the opposite side of the transverse end portion 133 include hooks and loops 134 and 135 respectively to secure the same together with a desired degree of overlap to adjust the tension of the seat fabric. The hook and loop construction is manufactured under the trade name VELCRO. It will be understood that the pillow 19 described in FIG. 1 would then be placed on the fabric wrapping described in FIG. 17.

A feature of the wrapping is the fact that proper tension can easily be developed since the initial end 130 of the wrapping as described in FIG. 16 is effectively non-stretchably secured to the seat rail 39 as by the hooks 131. A very tight tension in this wrapping can thus be effected when assembling the upholstery about the seat rails. It should further be noted that the weight of a person sitting in the chair will increase the tension in the wrapping. This tension will urge the seat rails 38 and 39 towards each other and since the forward ends 40 and 41 of these rails as described in FIG. 2 straddle the forward and downwardly sloping sections 22 and 29 of the left and right side frames of the main frame, the rails will be strongly biased inwardly towards each other. Tight engagement with the extending portions of the pins 50 will thus be assured. In other words, the upholstery fabric used on the seat serves the dual function of providing a seating area and also holding the rails in their attached position on the main frame.

Figure 18:
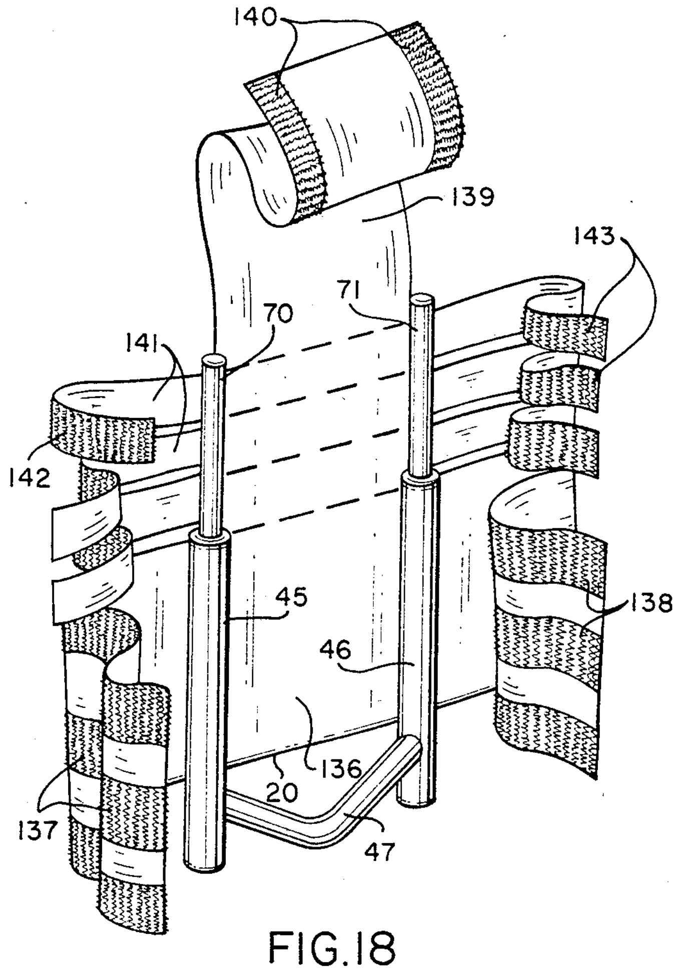
FIG. 18 is a schematic perspective view of the rear of the seat back frame showing the manner in which seat back upholstery wrapping is applied.
Figure 19:
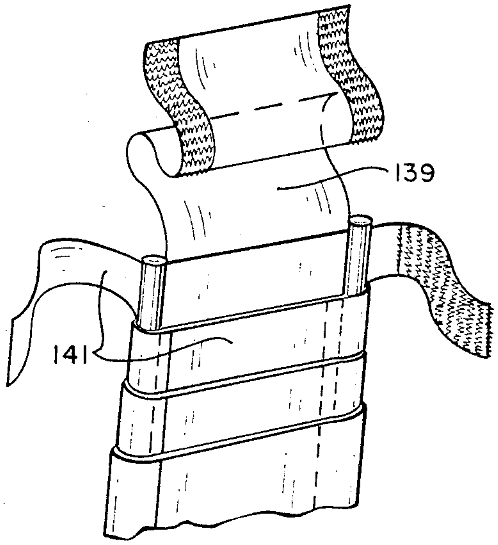
FIG. 19 is a view similar to FIG. 18 illustrating the subsequent appearance of the wrapping during the attaching procedure for the seat back upholstery.
Figure 20:
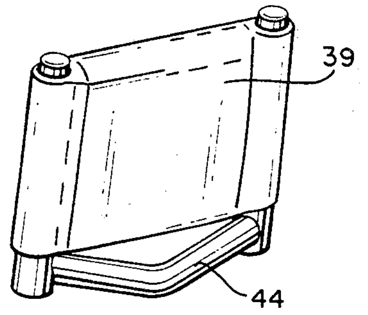
FIG. 20 shows the appearance of the seat back when the seat back upholstery has been completely positioned thereon for one condition of the wheelchair.

Referring now to FIGS. 18, 19, and 20, there is shown an example of the back upholstery wrapping 20. This wrapping is in the form of an inverted T, the cross of the T being indicated at 136 and positionable across the front of the back seat posts 45 and 46. The ends of the cross portion 136 terminate in VELCRO fastening means 137 and 138 respectively so that the same can be wrapped about the rear of the posts and the tension adjusted. The stem of the T constitutes essentially a dressing panel 139 which can be folded over the top of the back frame. This stem or dressing panel further includes VELCRO fastening means indicated at 140 which can wrap around the back of the fastened crossed T portions and thence under the fabric and back up the front portion to fasten to cooperating VELCRO on the front of the crossed T portion 136.

In FIG. 18, it will be noted that the telescoping tubes 70 and 71 have been raised upwardly from the posts 45 and 46 to provide an extended back frame. In this instance, the cross portion of the T of the upholstery wrapping includes a widened area formed of strips 141 to provide an increased area of the back frame to be covered depending upon the adjustment of the telescoping tubes. Successive strips are wrapped about the extension tubes in accord with the degree of extension, the end portions of the strips including VELCRO as at 142 and 143 for fastening the same in the same manner as the cross panel defining the cross of the T shape.

FIG. 19 shows the appearance of these upper strips 141 after fastening the same.

FIG. 20 shows the appearance of the back when the extension tubes have been telescoped completely in the posts so that the upper strips 141 are not used but simply folded downwardly under the dressing panel 139.

The provision of the VELCRO fastening for the upholstery wrapping for both the seat and back make it very simple for this fabric to be removed for cleaning purposes or for effecting various adjustments in the seat.

Figure 21:
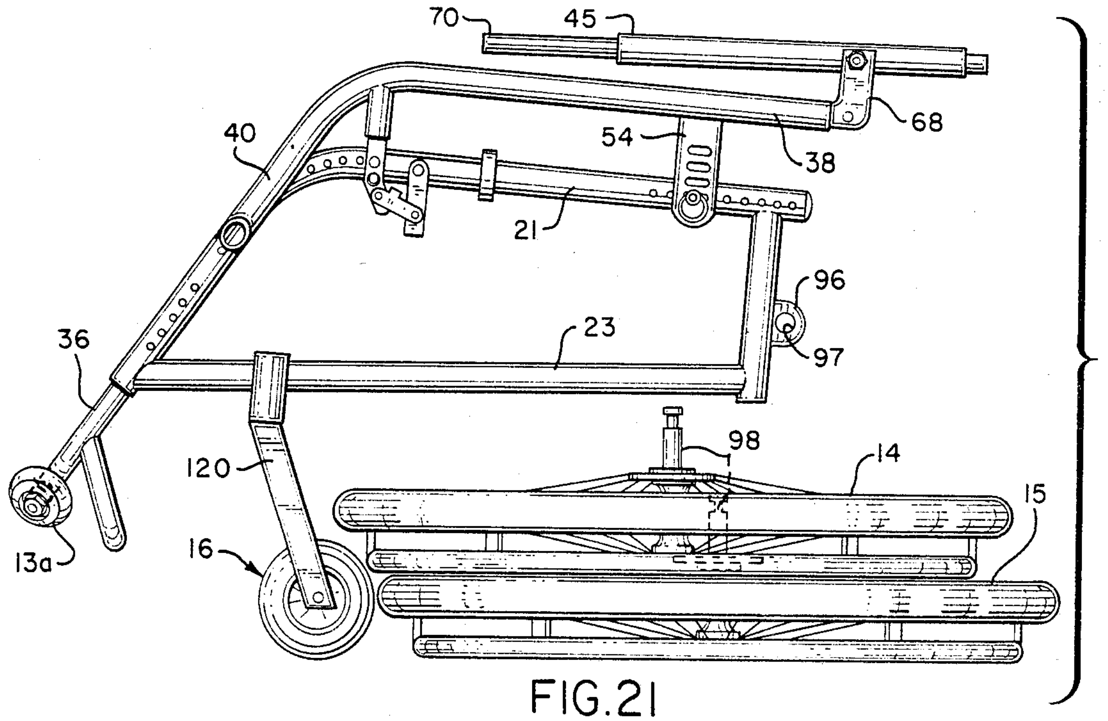
FIG. 21 is a side elevational view of the chair wherein the seat back frame has been folded down and the main wheels removed, for storage during travel.

FIG. 21 is a side elevational view of the wheelchair of this invention with the fabric removed and wherein the main wheels 14 and 15 have been removed and oriented in horizontal planes to provide with the remaining portions of the chair a compact configuration for storage during travel.

Figure 22:
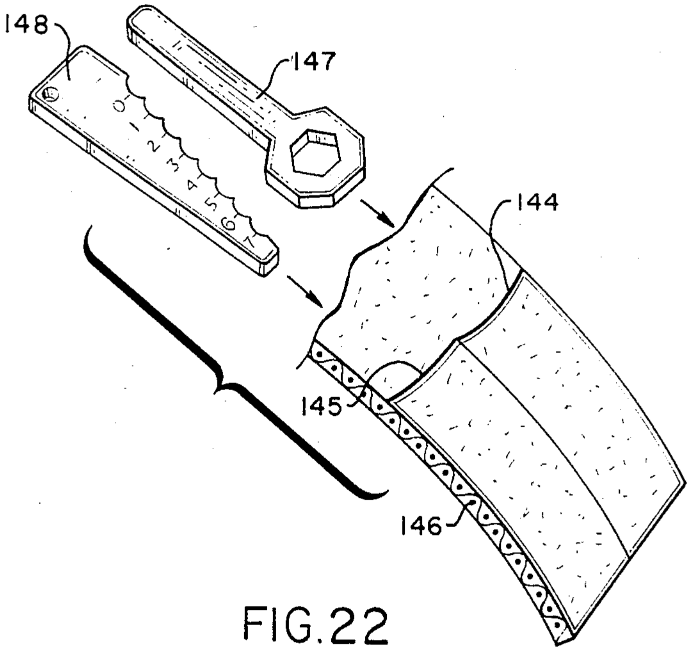
FIG. 22 is a fragmentary perspective view of a pocket provided on the upholstery material for holding tools shown exploded away from the pocket.

FIG. 22 shows pockets 144 and 145 which may be cut directly into the referred to other transverse end of upholstery wrapping. For example, the velcro strip 146 is shown in FIG. 17 prior to securement in the manner of the strip end 133. Pockets 144 and 145 are designed to hold a wrench 147 for the bolts 113 and 114 of FIG. 11, and a template 148 for indicating camber in degrees.

Figure 23:
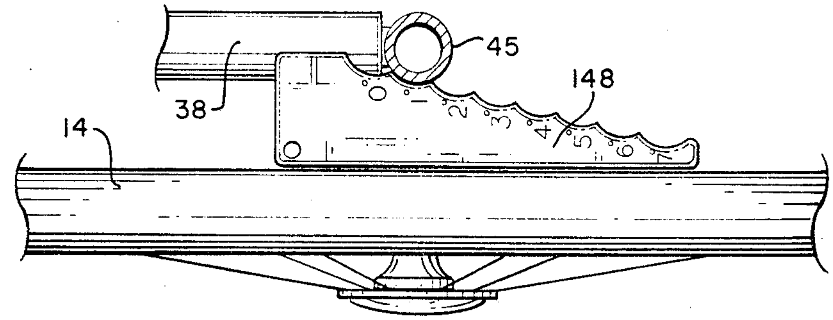
FIG. 23 illustrates in fragmentary plan view the manner in which one of the tools of FIG. 22 is used.

FIG. 23 illustrates how the template 148 is used. Thus, the angle in degrees of the plane of the wheel 14 to the vertical will be indicated by the particular notch in the template 148 within which the adjacent back post 45 is received when the template is positioned between the wheel and post. In the example illustrated, the camber is 1°.

From all of the foregoing, it will now be apparent that the present invention has provided a truly innovative wheelchair having distinct advantages over wheelchairs heretofore available. The unique feature of providing a separate main frame and separate seat frame, the same being secured together in any desired adjusted position enables the center of gravity of the chair to be easily adjusted and the chair comfort to be optimized for any particular patient. Moreover, a very strong and extremely light chair results.

A further consequence of lightness of the chair is its great maneuverability. This maneuverability is enhanced by the simple camber adjustment, through, in effect, an infinite number of positions as a consequence of the journalling plates described. The chair thus serves as a sports chair as well as a day-to-day use chair.

Finally, the ease with which the main wheels can be removed by one hand of the user as also described makes for a very convenient chair which can be easily disassembled as described.

Various changes falling within the scope and spirit of this invention will occur to those skilled in the art. The ultra light wheelchair is therefore not to be thought of as limited specifically to the particular embodiment set forth for illustrative purposes.

I claim:

1. An ultra light wheelchair including, in combination:
   (a) a main frame;
   (b) a seat frame;
   (c) means for attaching said seat frame to said main frame in a plurality of different longitudinal locations, tilt angles, and heights relative to said main frame;
   (d) a back frame;
   (e) coupling means including pivot means for pivoting the back frame to the rear of said seat frame so that the back frame can be folded down forwardly to overlie the seat frame;
   (f) left and right main wheels;
   (g) means for manually attaching and detaching said main wheels to said main frame; and
   (h) caster wheel means attached to said main frame forward of the main wheels whereby the back frame can be folded down over the seat frame and the main wheels detached from the main frame to enable compact storage of the wheelchair components during travel.

2. An ultra-light wheelchair according to claim 1, in which said coupling means further includes means for adjusting the tilt angle of said back frame relative to said seat frame.

3. An ultra light wheelchair according to claim 1, including upholstery wrapping for said seat frame and separate upholstery wrapping for said back frame, each wrapping having VELCRO type fastening means so that the seat and back upholstery can be easily removed for cleaning as well as adjustment with respect to tension.

4. An ultra light wheelchair including, in combination:
   (a) a main frame comprised of left and right frame sides, each including;
      (1) an horizontal longitudinally extending upper tube terminating at its front end in a forward and downwardly sloping section,
      (2) an horizontal longitudinally extending lower tube, running generally parallel to and beneath said upper tube, the front end of the lower tube being secured to the end portion of said downwardly sloping section and
      (3) a vertical tube connecting the rear end of said lower tube to the underside of the rear end portion of said upper tube so that the left and right frame sides considered together include two upper tubes, two lower tubes and two vertical tubes; said main frame further including first and second longitudinally spaced transverse tubes connected between the upper tubes of the left and right frame sides and a third transverse tube connected between the lower ends of the vertical tubes of the left and right frame sides for holding the left and right frame sides in spaced parallel relationship;
   (b) a foot rest including a generally U-shaped tube having rearward and upwardly extending legs connected to the forward and downwardly sloping sections respectively of the upper tubes of said left and right frame sides;
   (c) a seat frame disposed above said main frame and including left and right longitudinally extending seat frame rails spaced further apart than said left and right frame sides, said frame rails having forward and downwardly sloping front ends straddling the front ends of the upper tubes of said left and right frame sides; and a downwardly bowed seat frame tube extending transversely between said rails and connected to the rails at points closer to the rear ends of the rails than the front ends for holding the rails in spaced relationship at said points;
   (d) a back frame including upwardly extending left and right seat back posts and a downwardly bowed back frame tube extending transversely between said posts and connected to the posts at points adjacent to the lower ends of the posts;
   (e) seat attaching and adjustment means including the upper tubes of said left and right frame sides and said left and right rails for attaching the seat frame to the main frame and enabling adjustment of said seat frame relative to said main frame with respect to its longitudinal position, tilt and height;
   (f) coupling means including means for pivoting the lower portions of the back frame posts to the rear end portions of said seat frame rails so that the back frame can be folded down forwardly to overlie the seat frame;
   (g) left and right main wheels;
   (h) manually operable means for attaching and detaching said main wheels to rear end portions of the left and right frame sides of said main frame; and
   (i) left and right caster wheels secured to the forward portions of the lower tubes of the left and right frame sides of said main frame respectively whereby the main wheels can be manually removed from the main frame and the back frame folded forwardly over the seat frame to provide a compact configuration of the wheelchair components for storage during travel.

5. An ultra light wheelchair, according to claim 4, in which the legs of the U-shaped tube making up said foot rest are telescopically received in the forward and downwardly sloping sections respectively of the upper tubes of said left and right frame sides, each of said legs having a side opening and a spring biased lock button extending from the inside of the leg through the opening, said button being manually retractable into the opening to a position flush with the outside surface of the leg, the outer wall surface of each of said forwardly and downwardly sloping sections having a series of longitudinally spaced holes, a selected one of which can be placed in registration with the opening in the leg telescopically received in the section, so that said button will be biased outwardly through the opening and automatically snap into the registering hole to lock the leg to the section in its adjusted telescoped position whereby the foot rest can be moved closer to or further from said seat frame when the seat frame is attached to the main frame to adapt the chair for optimum comfort of a patient seated in the chair and using the foot rest.

6. An ultra light wheelchair according to claim 4, in which said attaching and adjustment means includes front and rear seat pins and rear adjusting plates having a series of horizontal slots in vertical alignment said upper tubes of the left and right frame sides having front and rear series of longitudinally spaced diametric holes, and the forward inner surfaces of said left and right rails having a series of longitudinally spaced holes, whereby said front seat pins can be passed diametrically through selected ones of the front series of longitudinally spaced diametric holes in the upper tubes to extend from the outer sides of the tubes, and selected ones of the series of longitudinally spaced holes on the forward inner surfaces of the left and right rails, straddling the upper tubes positioned to register with and receive the extending front pins, the rear seat pins being passed through selected slots of said rear adjusting plates and thence into the registering holes in the rear series of longitudinally spaced diametric holes of the upper tubes, thereby attaching the seat frame to the main frame in a position in which the longitudinal position, tilt, and height of the seat frame has been adjusted for optimum comfort of a patient seated on the seat frame.

7. An ultra light wheelchair according to claim 4, in which said coupling means comprise left and right L-shaped brackets, the horizontal legs of the brackets being rigidly secured to the inside end portions of said left and right rails respectively, the vertical legs of the brackets lying along the inner facing walls of the left and right posts, each bracket having at the upper end of its vertical leg a slot of sufficient width to accommodate an arcuate path; and the vertex of each L-shaped bracket having a hole corresponding to the center of curvature of said arcuate path, the lower end of each seat back post having an opening passing through its inside wall in registration with said hole in the associated bracket and a diametric opening at a higher level in registration with said slot; a spring biased lock button in the lower end of each post biased to extend through said opening of the inside wall of the post into the hole of the corresponding bracket; and diametric bolt means passing through the slot of the L-shaped bracket and through said diametric hole in the post to define said means for pivoting the lower portion of the respective back frame posts to the rear end portions of the seat frame rails, retraction of each lock button permitting rotation of the posts about said diametric bolt means, each of said diametric bolt means including a bolt, a journalling sleeve and a nut, said journalling sleeve passing through the diametric opening in the associated post to journal pivoting movement of the post, one end of the sleeve engaging the upper and lower edges of the slot in the associated L-shaped bracket, said bolt passing within the sleeve with its head engaging the opposite upper and lower edges of said slot, said nut being threadedly received on the extending end of the bolt to overlie the other end of the sleeve so that tightening of the nut locks a selected arcuate position of the bolt in the slot whereby the tilt angle of the seat back frame relative to the seat frame can be adjusted for optimum comfort to a patient seated in the wheelchair.

8. An ultra light wheelchair, according to claim 4, in which there are provided back post extension tubes telescopically received in the upper ends of said seat back posts, each of said extension tubes having a side opening in its lower wall and a spring biased lock button extending from the inside of the extension tube through the side opening, each of said posts having a series of vertically spaced holes, a selected one of which can be placed in registration with the side opening in the extension tube so that said button will be biased outwardly through the side opening and automatically snap into the registering hole to lock the extension tube in its adjusted telescoped position whereby the height of the back frame can be adjusted for optimum comfort of a patient seated in the wheelchair and leaning against the back frame.

9. An ultra light wheelchair according to claim 4, in which said manually operable means for attaching and detaching said main wheels include, for each wheel, a journalling plate having an axle receiving bore, each wheel having an axle receivable in said bore, the outer end portion of each axle having a reduced diameter section to define an annular channel, a portion of the bore wall juxtaposed to said channel when the axle is fully inserted in the bore, having an opening; a manually operable pawl pivoted to said plate and spring biased to a position in which said pawl is received through said opening into said annular channel to thereby lock the axle against withdrawal from said bore, manual pivoting of the pawl in the direction opposite to the biased direction removing the pawl from said channel so that the axle can be easily withdrawn from said bore to remove the wheel, with one hand, said journalling plate further including a first arm extending vertically along the rear side of the vertical tube constituting part of one of said frame sides, and a second arm extending generally horizontally in a direction opposite the direction of the axle receiving bore in the journalling plate so as to lie along the rear side of said third transverse tube constituting a part of said main frame, the upper end of said first arm being pivoted to said vertical tube at a given pivot point, the inner end of said second arm having a first slot of sufficient width to accommodate a first arcuate path with the center of curvature of said first arcuate path at said pivot point and the outer end of said second arm having a second slot of sufficient width to accommodate a second arcuate path with the center of curvature of said second arcuate path at said pivot point, said third transverse tube having diametric holes positioned to register with said slots; first and second bolt members for passing through said first and second slots and registering holes respectively, each bolt having an enlarged head for engaging the periphery of its associated slot; first and second nuts for the bolts, each nut overlying the periphery of the exit end of its associated diametric hole; and a compression sleeve surrounding each bolt between its nut and the inside periphery of the entrance end of its associated diametric hole so that each second arm of the journalling plate can be tightly clamped to said third transverse tube after adjusting the angle of the axis of the axle receiving bore with respect to the horizontal within the limits of the arcuate paths encompassed in the slots to thereby enable the camber angle of each main wheel relative to a vertical plane to be individually adjusted.

10. An ultra light wheelchair according to claim 4, in which each of said lower tubes of said main frame has secured thereto a caster stem socket incorporating bearings, each of said caster wheels including an integrally formed sloping fork member, a wheel rotatably mounted on an axle passing into bores in the lower ends of the fork member, a split sleeve surrounding said axle and gripping the same to prevent longitudinal movement of the axle out of the fork member, and a caster stem extending generally vertically upwardly from the top portion of the fork member receivable in said caster stem socket, said upper portion of the fork member constituting a solid block having a vertical bore formed therein, the lower portion of the caster stem having an enlarged diameter portion for seating on top of the block when the remaining lower portion is received in the bore, the lower end of the stem having a cavity permitting a flaring out of the stem end to engage the periphery of the lower end opening of the bore to secure the caster stem portion between the enlarged diameter portion and the lower end in the block.

11. An ultra light wheelchair according to claim 4, including upholstery wrapping for said seat frame, said wrapping including a fabric seat panel of elongated rectangular shape having one transverse end terminating in hook means for attaching the end to one of said seat frame rails, an initial portion of the panel thence passing under and around over the top of the other seat frame rail and back over the initial portion and around the first rail, the other transverse end terminating underneath the initial panel portion, the underside of said initial portion and the opposed side of the other transverse end having hooks and loops to secure the same together with a adjustable degree of tension.

12. An ultra light wheelchair according to claim 11, including upholstery wrapping for said back frame, said wrapping including a fabric back panel of inverted T shape, the cross of the T being positionable across the front of the back seat posts, the ends of the cross terminating in VELCRO fastening means so that the same can be wrapped about the rear and the tension adjusted, the stem of the T constituting a dressing panel which can be folded over the top of the back frame and which stem further includes VELCRO fastening means for securement to the back fabric portions.

13. An ultra light wheelchair according to claim 12, in which said cross portion of the T of the back frame wrapping includes a widened area formed of strips enabling an increased area of the back frame to be covered depending upon the adjustment of said telescoping tubes receivable in the back frame posts, successive strips being wrapped about the extension tubes in accord with the degree of extension, the end portions of the strips including VELCRO for fastening the same in the same manner as the cross panel defining the cross of the T shape.

14. An ultra light wheelchair according to claim 11, including two pockets formed by cutting into said other transverse end of said upholstery wrapping for said seat panel; and a wrench and camber template receivable in said pockets for convenient storage on said wheelchair.

15. A wheelchair including, in combination:
(a) a main frame;
(b) left and right main wheels; and
(c) means for adjusting the camber angle of each of the main wheels individually, said means including, for each wheel:
(1) a journalling plate having an axle receiving bore for journalling a wheel of the wheelchair, said journalling plate having an extending arm pivoted to the main frame at a given pivot point, and a second arm extending adjacent to another portion of said main frame including a slot of sufficient width to accommodate an arcuate path with the center of curvature of the arcuate path at said pivot point, said other portion of the frame having a diametric hole positioned to register with said slot;
(2) a bolt member passing through the slot and registering hole, said bolt having an enlarged head for engaging the periphery of the slot;
(3) a nut overlying the periphery of the exit end of said diametric hole, said nut being threadedly received on the end of said bolt; and
(4) a compression sleeve surrounding the bolt between the nut and the inside periphery of the entrance end of the diametric hole so that the second arm of the journalling plate can be tightly clamped to said other portion of the main frame after adjusting the angle of the axis of the axle receiving bore with respect to the horizontal within the limits of the arcuate path encompassed in the slot to thereby enable the camber angle of the associated main wheel relative to a vertical plane to be adjusted.

16. A wheelchair according to claim 15, including a tool holder pocket for carrying on the wheelchair including a wrench for loosening and tightening said bolt in making a camber angle adjustment; and a camber angle template for indicating the camber angle of the wheel relative to a vertical frame.

17. An ultra light wheelchair including, in combination:
a main frame;
left and right main wheels;
a separate seat frame;
attachment means for attaching said seat frame to said main frame in a desired position;
a back frame,
said attachment means for attaching the seat frame to the main frame including means for adjusting the longitudinal position, tilt, and height of the seat frame relative to the main frame; and
means pivoting the back frame to the seat frame so that the back frame can be folded down forwardly over the seat frame, whereby the wheels can be manually removed and the back frame folded down to facilitate storing the wheelchair during travel.

18. A wheelchair comprising:
a main frame;
left and right main wheels mounted on said main frame;
caster wheel means attached to said main frame for supporting said main frame in a position spaced from said main wheels;
a U-shaped seat frame having approximately parallel left and right seat frame rails each with forward and rearward ends,
said main frame having approximately parallel left and right rails fixed in positions slightly inboard of said seat frame rails, each of said main frame rails having a forward end and a rearward end;

pivot means selectively adjustable on said main frame rails to mount said forward ends of said seat frame rails rotatably about a selected one of a plurality of forward axes; and latch means to fix said rearward ends of said left and right seat frame rails relative to said rearward ends of said left and right main frame rails, respectively.

19. The invention as defined in claim 18, wherein:

each of said rails includes a hollow tube;

said pivot means including a first and second series of holes spaced along the lengths of the forward ends of the respective left and right main frame rails, said first series of holes facing said second series of holes with each first series hole having a horizontal axis the same as that of the corresponding second series hole, third and fourth series of holes through said main frame rails having holes lying registration with those of said first and second series on opposite sides of the tubes of said main frame rails, fifth and sixth series of facing holes on the inside of said left and right seat frame rails, respectively, at said forward ends thereof, first removable pin means fixable in a set of registering holes of said first, third and fifth series, and second removable pin means fixable in a set of registering holes of said second, fourth and sixth series at the same elevation as that of said first removable pin means.

20. The invention as defined in claim 19, wherein:

said left main frame rail rearward end has first and second auxiliary series of transverse registering holes on parallel horizontal axes, said right main frame rail rearward end having third and fourth auxiliary series of transverse registering holes on parallel horizontal axes the same as corresponding respective axes of said first and second auxiliary series of holes.

left and right plates fixed to said left and right seat frame rails therebelow, each of said plates having a plurality of approximately parallel horizontal slots to lie at least in registry with at least two of the holes in two of said auxiliary series.

21. The invention as defined in claim 18, wherein:

said left main frame rail rearward end has first and second auxiliary series of transverse registering holes on parallel horizontal axes, said right main frame rail rearward end having third and fourth auxiliary series of transverse registering holes on parallel horizontal axes the same as corresponding respective axes of said first and second auxiliary series of holes, left and right plates fixed to said left and right seat frame rails therebelow, each of said plates having a plurality of approximately parallel horizontal slots to lie at least in registry with at least two of the holes in two of said auxiliary series.

22. The invention as defined in claim 18, wherein:

each of said main frame rails has a plurality of registering holes on respective corresponding axes, a first pin through a pair of registering holes through one main frame rail, a second pin through a pair of registering holes through the other main frame rail, an anti-friction disc fixed to each pin on the outside of each main frame rail spaced from each end of a corresponding pin, said forward ends of said seat frame rails having facing holes, said seat frame rails being slightly sprung towards each other to fit over said pins against said anti-friction disc.

* * * * *